United States Patent
Hewitt

(10) Patent No.: US 6,832,471 B2
(45) Date of Patent: Dec. 21, 2004

(54) EXPANDER CYCLE ROCKET ENGINE WITH STAGED COMBUSTION AND HEAT EXCHANGE

(75) Inventor: Ross A. Hewitt, Sacramento, CA (US)

(73) Assignee: Aerojet-General Corporation, Sacramento, CA (US)

( * ) Notice: Subject to any disclaimer, the term of this patent is extended or adjusted under 35 U.S.C. 154(b) by 31 days.

(21) Appl. No.: 10/388,266

(22) Filed: Mar. 12, 2003

(65) Prior Publication Data

US 2004/0177603 A1 Sep. 16, 2004

(51) Int. Cl.[7] .............................. C06D 5/00; F02K 5/00; F23R 5/00
(52) U.S. Cl. ........................ 60/207; 60/200.1; 60/205; 60/206; 60/211; 60/217; 60/257
(58) Field of Search ................................ 60/200.1, 207, 60/205, 206, 210, 211, 217, 257, 258, 260, 266, 267

(56) References Cited

U.S. PATENT DOCUMENTS

| | | | | |
|---|---|---|---|---|
| 2,523,656 A | * | 9/1950 | Goddard | 60/258 |
| 2,526,222 A | * | 10/1950 | Goddard | 60/260 |
| 2,654,997 A | * | 10/1953 | Goddard | 60/265 |
| 2,709,887 A | * | 6/1955 | Goddard | 60/258 |
| 2,906,091 A | * | 9/1959 | Kretschmer | 60/39.27 |
| 3,085,393 A | * | 4/1963 | Hamlin, Jr. | 60/211 |
| 3,137,130 A | * | 6/1964 | Tinkelenberg | 60/258 |
| 3,168,807 A | * | 2/1965 | Ledwith et al. | 376/318 |
| 3,229,457 A | | 1/1966 | Rowe et al. | |
| 3,266,241 A | * | 8/1966 | Jennings | 60/258 |
| 3,308,619 A | * | 3/1967 | Richardson et al. | 60/39.27 |
| 3,490,238 A | * | 1/1970 | Capps et al. | 60/258 |
| 3,695,515 A | | 10/1972 | Stockel | |
| 3,828,551 A | * | 8/1974 | Schmidt | 60/204 |
| 3,903,693 A | * | 9/1975 | Fox | 60/200.1 |
| 3,910,037 A | * | 10/1975 | Salkeld | 60/250 |
| 4,069,664 A | * | 1/1978 | Ellion et al. | 60/258 |
| 4,073,138 A | * | 2/1978 | Beichel | 60/245 |
| 4,214,439 A | * | 7/1980 | Browning et al. | 60/216 |

(List continued on next page.)

OTHER PUBLICATIONS

Fleig, "Cooling of the Rocket Engine", http://www.vision-engineer.com/aero/cooling.shtml.
The Pratt Whitney Office, "RL–10 Rocket Engine (1958)", http://www.asme.org/history/roster/H036.html.
The Pratt Whitney Office, "RL 10", http://www.pratt–whitney.com/3a/html/products_/110.html.
The Pratt Whitney Office, "RL–10 Summary", http://www.spaceandtech.com/spacedata/engines/r110_sum.shtml.
The Pratt Whitney Office, "RL–60 Summary", http://www.spaceandtech.com/spacedata/engines/r150_sum.shtml.

Primary Examiner—Cheryl J. Tyler
Assistant Examiner—William H. Rodriguez
(74) Attorney, Agent, or Firm—M. Henry Heines; Townsend and Townsend and Crew, LLP

(57) ABSTRACT

In a supersonic nozzle incorporating injectors and a combustion chamber as part of an expander cycle rocket engine, the oxidizer is injected in two streams. One of the streams, preferably a small fraction of the total, is injected into an upstream or preburner section of the combustion chamber and the other to a downstream or main section of the chamber. The preburner combustion gas is cooled in a substantially uniform manner to a moderate temperature by cooling the bulk of the gas rather than cooling only the gas in a boundary layer adjacent to the chamber wall. The combustion gas produced in the downstream section is hotter, and heat from that gas is drawn through the chamber wall into a jacket. The limited combustion in the preburner permits the use of a cooling element with highly intimate heat exchange construction, extracting a high level of energy from the preburner gas without damage to the cooling element and an overall improvement in the regenerative cooling.

15 Claims, 2 Drawing Sheets

U.S. PATENT DOCUMENTS

| | | | | |
|---|---|---|---|---|
| 4,223,530 A | * | 9/1980 | Kirner et al. | 60/204 |
| 4,369,920 A | * | 1/1983 | Schmidt | 239/127.3 |
| 4,583,362 A | | 4/1986 | Wagner | |
| 4,771,600 A | * | 9/1988 | Limerick et al. | 60/258 |
| 4,841,723 A | * | 6/1989 | Lau et al. | 60/204 |
| 4,879,874 A | * | 11/1989 | Koyari et al. | 60/259 |
| 4,901,525 A | * | 2/1990 | Beveridge et al. | 60/211 |
| 4,912,925 A | * | 4/1990 | Foust | 60/259 |
| 5,054,287 A | * | 10/1991 | Schneider | 60/240 |
| 5,267,437 A | * | 12/1993 | Foust | 60/206 |
| 5,387,398 A | | 2/1995 | Mueggenburg et al. | |
| 5,404,715 A | * | 4/1995 | Vuillamy et al. | 60/257 |
| 5,410,874 A | | 5/1995 | Limerick | |
| 5,557,928 A | * | 9/1996 | Castro et al. | 60/260 |
| 5,603,213 A | | 2/1997 | Sion et al. | |
| 5,619,851 A | * | 4/1997 | Johnson et al. | 60/267 |
| 5,804,066 A | | 9/1998 | Mueggenburg et al. | |
| 5,832,719 A | | 11/1998 | Riccardi | |
| 5,899,388 A | | 5/1999 | Sion et al. | |
| 5,903,976 A | | 5/1999 | Beaurain et al. | |
| 6,116,020 A | * | 9/2000 | Cornelius et al. | 60/258 |
| 6,151,887 A | * | 11/2000 | Haidn et al. | 60/257 |
| 6,226,980 B1 | * | 5/2001 | Katorgin et al. | 60/258 |
| 6,244,041 B1 | * | 6/2001 | Vasin et al. | 60/258 |
| 6,253,539 B1 | * | 7/2001 | Farhangi et al. | 60/211 |
| 6,536,208 B1 | * | 3/2003 | Kretschmer | 60/258 |
| 6,601,380 B2 | * | 8/2003 | Knuth et al. | 60/219 |
| 6,640,536 B2 | * | 11/2003 | Kline et al. | 60/219 |
| 2002/0092291 A1 | * | 7/2002 | Bichler et al. | 60/257 |

* cited by examiner

EXPANDER CYCLE ROCKET ENGINE WITH STAGED COMBUSTION AND HEAT EXCHANGE

BACKGROUND OF THE INVENTION

1. Field of the Invention

This invention resides in the field of combustion systems for liquid-fuel rocket engines, and is particularly concerned with heat exchange structures for expander cycle rocket engines.

2. Description of the Prior Art

Rocket engines such as those used on space missions require both high thrust and a durable construction that can withstand the extreme conditions of temperature and pressure encountered upon takeoff and in flight and that will enable repeated use of the engines in successive firings. Expander cycle rocket engines use regenerative cooling to achieve both high thrust and durability. In the typical expander cycle rocket engine, the combustion chamber walls and nozzle walls are cooled by uncombusted fuel fed by a turbopump into a jacket that surrounds the chamber and nozzle. The heated fuel emerging from the jacket is cycled through the turbine side of the turbopump to serve as the driving medium for the pump. The expanded fuel emerging from the turbine side of the pump then passes into the combustion chamber injector for combustion with oxidizer in the combustion chamber. The cycle thus cools the walls of the combustion chamber and nozzle while converting a portion of the heat generated by the engine to a higher flow rate of fuel to the combustion chamber and hence a higher pressure the combustion chamber, and using the rest of the heat to preheat the fuel prior to the fuel being fed to the combustion chamber injector.

The energy that the fuel acquires in the chamber wall coolant jacket is drawn from the boundary layer of hot combustion gases inside the chamber and nozzle rather than from the bulk of the combustion gas. When heat exchange occurs only at the boundary layer, the amount of energy that can be acquired by the fuel on the coolant side is limited because of the limited surface area and the fact that excessive heat flux in the chamber can result in chamber failure.

The most efficient heat exchange structures are those that provide the most intimate contact between the medium to be cooled and the coolant, i.e., the thinnest separating walls and the narrowest flow channels which provide the greatest surface area for heat transfer. One type of structure that offers both of these features is a laminated platelet stack formed by the bonding together of very thin sheets of heat-conductive metal, the sheets having been individually chemically etched prior to bonding to form very narrow, intricate flow passages. These delicate structures can become weakened at extremely high temperatures, however, causing damage such as cracks in the walls separating the passages. For this reason, platelet structures have been used only in the jacket surrounding the chamber and nozzle where they encounter only the boundary layer of the combustion gas flow. While this avoids exposing the platelet structures to destructive temperatures, it severely limits the amount of surface area across which for heat can be transferred and hence the amount of energy that can be extracted by the coolant from the combustion gas.

BRIEF SUMMARY OF THE INVENTION

It has now been discovered that unusually high heat exchange efficiency by regenerative cooling in an expander cycle rocket engine can be achieved by an injector/combustion chamber/heat exchanger assembly that divides the oxidizer feed to the rocket engine into two streams, injected separately at different locations along the direction of flow of the fuel toward the main portion of the combustion chamber, each injection followed by a different mode of heat exchange. The first stream is preferably a minor stream, i.e., with a flow rate that is substantially lower than that of the second stream, and the region into which the first stream is injected serves as a preburner in which this minor portion of oxidizer is mixed with the entire flow of fuel, causing a small portion of the fuel to burn and thereby preheat the remaining fuel. The second oxidizer stream, which constitutes the remainder of the total oxidizer fed to the engine, is injected at the entry plane of the main portion of the combustion chamber where it reacts with the preheated fuel to complete the combustion. Heat exchange occurs in the preburner section between the coolant-side fuel and the bulk of the preheated fuel rather than a boundary layer at the preburner wall. Heat exchange in the main portion of the combustion chamber then occurs between the coolant-side fuel in the heat-exchange jacket and the combustion gas near the wall of the chamber. The "coolant-side fuel" is the uncombusted fuel that is heated by the engine and then directed to the turbine side of the turbopump. The terms "preheated fuel" and "preheated fuel mixture" are used herein to refer to the fuel-rich gas mixture that enters the main portion of the combustion chamber after having been partially burned in the preburner section with the first (minor) stream of oxidizer. This definition is used despite the fact that the temperature rise of the coolant-side fuel that emerges from the heat exchange elements is also a form of preheating.

The invention thus resides in a combination of staged combustion and staged heat exchange between the combustion gas and the uncombusted fuel that serves as the coolant. The preburner combustion product is therefore a fuel-rich mixture with a relatively small heat load compared to the combustion gas that would be produced by a non-staged system, and the heat load is low enough that the first-stage combustion gas can be cooled by a platelet-type heat exchanger. Furthermore, by drawing energy from the bulk of the preburner combustion product rather than only the boundary layer, the coolant-side fuel can draw more energy and produce a higher chamber pressure by way of the turbopump than regenerative cooling systems of the prior art.

These and other features of the invention, as well as various preferred embodiments, are described in greater detail below.

DETAILED DESCRIPTION OF THE INVENTION AND PREFERRED EMBODIMENTS

Figure 1:
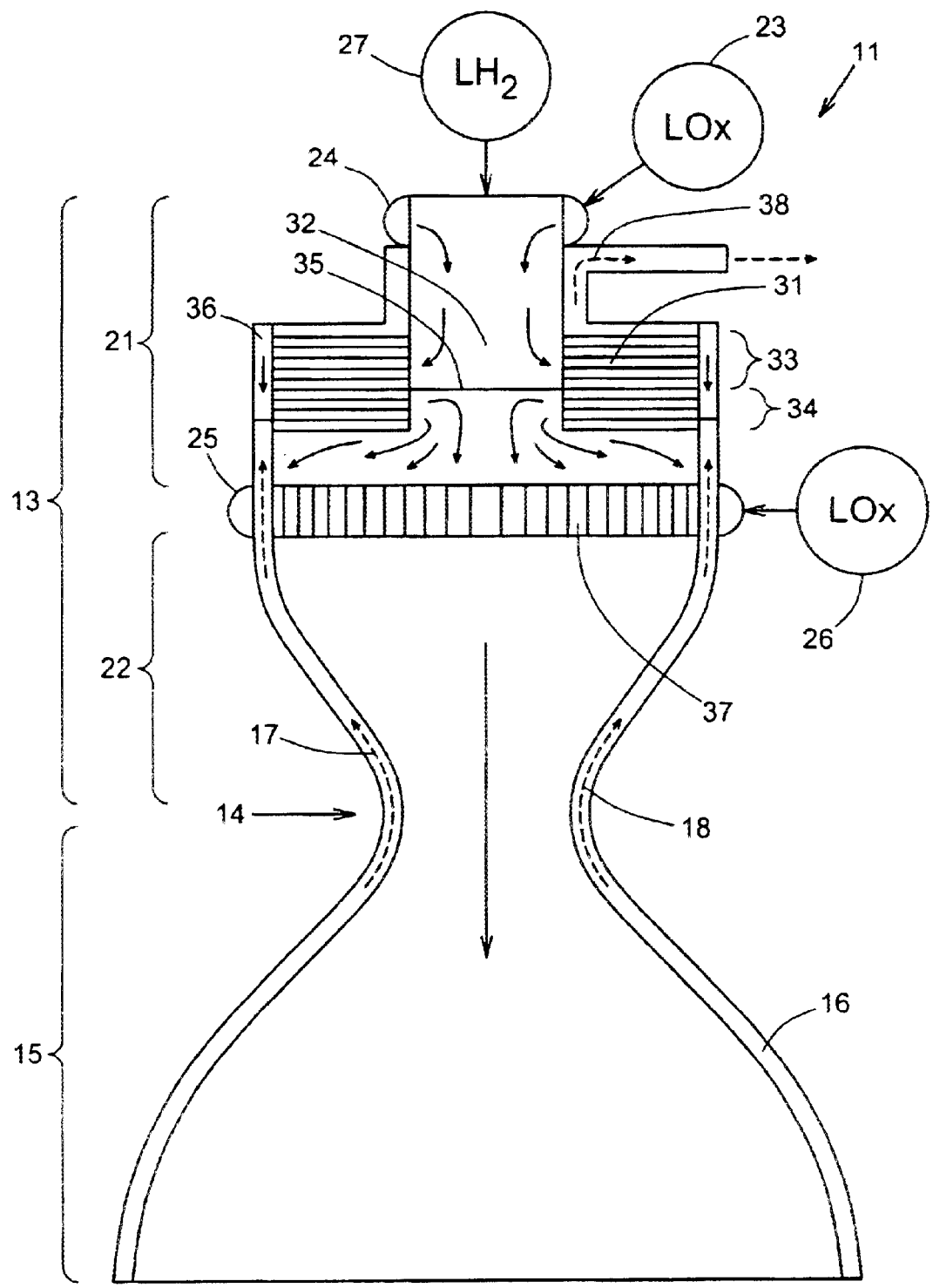
FIG. 1 is a cross section of a supersonic nozzle that contains features of the present invention.

While this invention is applicable to rocket engines that are powered by fluid, preferably liquid, fuel and fluid, preferably liquid, oxidizer in general, the preferred engines are those that utilize liquid hydrogen as the fuel and liquid oxygen as the oxidizer. It is further preferred that the ratio of total liquid oxidizer to total liquid fuel fed to the engine be either stoichiometric or one in which the fuel is in excess so that the combustion gas mixture approaching the throat plane of the engine contains no oxidizer and either no uncombusted fuel or at most a small proportion of uncombusted fuel. Thus, in preferred embodiments of the invention, the combined rate of liquid oxidizer injected into the fuel at both the upstream and downstream locations is from about 50% to about 100% of the stoichiometric amount relative to the feed rate of fuel, and most preferably from about 65% to about 85%.

The split of the oxidizer streams, i.e., the relative amounts being injected in the preburner section and the main section of the chamber, may vary and the exact amounts are not critical to the novelty of this invention or to the operation of the engine. Those skilled in the art will understand, however, that as the proportion fed to the preburner section is increased, the heat generated in that section and the strain on the heat exchange elements in that section are increased as well, since increased amounts of oxidizer produce greater combustion and hence higher temperatures. In some cases, too great a feed of oxidizer to the preburner section may even result in greater difficulty in efficiently extracting heat from that section. In most cases, best results will be obtained when the liquid oxidizer fed to the preburner section is from about 3% to about 30% of the total liquid oxidizer fed to the engine, or preferably from about 5% to about 20%. When considering the temperature reached in the preburner section, it is preferred that the preheated fuel mixture emerging from the heat exchange elements in that section not exceed 2000 degrees Rankine (1540 degrees Fahrenheit, 840 degrees Celsius).

In a presently preferred practice of this invention in which the fuel is liquid hydrogen and the oxidizer is liquid oxygen, the ratio of total oxygen feed rate (both streams) to hydrogen feed rate is approximately 6:1 on a weight basis (as compared to the stoichiometric ratio of 8:1), and the proportion of the oxygen fed to the preburner section is about 10% of the total oxygen feed rate.

Heat exchange between the preheated fuel mixture produced in the preburner section and the coolant-side fuel is achieved by an intermingling array of coolant channels and preheated fuel channels in heat exchange relationship with each other. At least a substantial portion of the preheated fuel, and preferably the entire preheated fuel, is thus passed through the combustion gas (i.e., preheated fuel) channels, each such channel adjacent to a coolant channel with only a thin heat-conductive wall separating the two. All of these channels can be formed by platelet technology, which is well known in the art, a representative description of which can be found in U.S. Pat. No. 5,387,398 (Mueggenburg et al., issued Feb. 7, 1995) and U.S. Pat. No. 5,804,066 (Mueggenburg et al., issued Sep. 8, 1998), the contents of each of which are incorporated herein by reference in their entirety. As described in these patents, the formation of channels by platelet technology generally begins by applying masks to platelets (thin metallic sheets), either by stencils or by photographic techniques. The platelets are then chemically etched through the masks, and the masks are removed. The platelets are then laminated by either diffusion bonding, roll bonding, brazing, or other conventional techniques for laminating metals. Diffusion bonding is a preferred method for rocket combustion chambers and nozzles and is achieved by hot-pressing the platelets together, using pressures typically in the range of 6.9 to 20.7 MPa (1000 to 3000 psi) and temperatures typically in the range of 450° C. to 550° C. The platelet material can be any heat-conductive material that can be formed into appropriately thin sheets and that can be etched and laminated by any of the methods listed above. Examples of materials that meet this description are copper, steel, and other metals commonly used in the construction of rocket combustion chambers and nozzles. The thickness of each platelet can vary and the exact thickness is not critical to the operation of the engine or to the novelty of this invention. In most cases, platelets having thicknesses less than about 0.025 inch (0.064 cm), or within the range of about 0.001 inch (0.00254 cm) to about 0.025 inch (0.064 cm), will provide the best results in terms of ease of manufacture and the formation of channels of the appropriate dimensions. The total number of platelets in the laminate can vary and will be selected on the basis of the desired heat transfer load, the pressure drop and flow rates through the channels, and other general matters of construction, as well as the ability to withstand the conditions expected to be encountered during use. In most cases, the number of platelets may range from 10 to 2,500, although preferably from 50 to 1,000.

The size and spacing of the channels is also variable, and will be selected on the basis of the heat needed for achieving the desired turbine power as well as the cooling needs of the nozzle as governed by the nozzle dimensions and operating conditions. In most cases, best results will be obtained with channels having a cross-sectional area of from about 0.001 square inch to about 0.03 square inch (about 0.0065 $cm^2$ to about 0.76 $cm^2$). A presently preferred channel size is 20 mils by 40 mils (0.020 inch by 0.040 inch, or 0.051 cm by 0.102 cm), although channel sizes up to twice these dimensions are contemplated as well. The thickness of the walls between channels is preferably approximately equal to the width of a single channel.

The channels through which the coolant (the uncombusted fuel) passes are separate from those through which the combustion gas (the preheated fuel) passes, but the two types of channels are preferably immediately adjacent to each other (separated in most cases by only a single platelet thickness) to allow heat transfer between the combustion gas and the coolant. The two groups of channels may thus occupy different levels in the platelet stack or may alternate with each other at the same level (i.e., in the same platelet). In general, any arrangement or configuration that provides intimate contact can be used. The flow directions of the two groups may be co-current or counter-current, although optimal heat transfer efficiency will be achieved with a counter-current arrangement. The platelet stack extends into the body of the preburner section, and the arrangement of the platelets relative to the direction of flow can vary. In preferred constructions, the platelets and channels are arranged in directions that are transverse to the direction of flow, with the coolant traveling in a direction opposite to the direction of the combustion gas to achieve counter-current flow. This type of flow can be achieved by flow of each in the radial direction, with the coolant flowing outward from the centerline of the chamber and the combustion gas flowing inward toward the centerline, or vice versa. Counter-current flow can also be achieved by the two gases flowing laterally across the entire cross section of the preburner section in opposite directions. Other configurations and flow arrangements will be readily apparent to those skilled in the art.

The heat exchange jacket that cools the walls of the main portion of the combustion chamber (downstream of the injection plane of the remainder of the oxidizer) preferably extends also to the throat and the skirt (the divergent portion of the chamber/nozzle assembly). Preferably, the jacket itself consists of a plurality of individual channels, and most preferably these are formed by platelet technology similar to or the same as that described above. The channels are limited to the periphery of the structure and contact only the combustion gas adjacent to the structure wall and flowing axially. The channels may themselves be axial or they may be spirally oriented, i.e., running at an acute angle to the projection of the chamber axis (centerline) on the chamber wall. Channels oriented at such an angle are described in co-pending U.S. patent application Ser. No. 10/308,645, filed Dec. 2, 2002, entitled "Nozzle With Spiral Internal Cooling Channels" (Ross A. Hewitt, inventor), the contents of which are incorporated herein by reference in their entirety.

As the description above illustrates, this invention is capable of implementation in a variety of ways. A detailed understanding of the invention and its scope can be achieved however by an examination of specific embodiments. One such embodiment is shown in the drawings and described below.

The cross-section view of FIG. 1 shows the nozzle 11 (including injectors and a combustion chamber) of a supersonic rocket engine. Combustion gases flow through the nozzle in the axial direction indicated by the arrow 12, passing first through the combustion chamber 13, then through the throat 14, and finally through the supersonic section or skirt 15. A coolant jacket 16 encircles the lower portion of the combustion chamber, the throat and the skirt. The coolant jacket 16 is of platelet construction, with coolant channels arranged either lengthwise through the jacket or in parallel spirals inside the jacket. The direction of coolant flow in the jacket, as indicated by the dashed arrows 17, 18, is counter-current with the direction of combustion gas flow through the chamber.

The combustion chamber 13 has an upstream or preburner section 21 and a main downstream section 22 for the first and second combustion stages, respectively. The first portion of liquid oxygen 23 is fed to an inlet torus 24 surrounding the upstream portion, the torus directing the liquid oxygen through the chamber wall and into the interior of the chamber, distributing the oxygen around the chamber circumference. At the entry plane of the downstream section 22 is a second inlet torus 25 through which the remainder of the liquid oxygen 26 is fed. The heated gaseous hydrogen 27 from the turbopump turbine exhaust is fed to the preburner section 21 for combustion.

The heat exchange element in the preburner section is a platelet laminate 31, which in this example consists of a laminate of circular disks with central openings 32. The laminate consists of two stacks of such disks 33, 34, one above the other, separated by a barrier disk 35 at mid-level that lacks a central opening. An open space 36 around the periphery of both disk stacks permits flow into and out of the disk stacks. The disk stacks above and below the barrier disk 35 each contain disks that have elongated radially oriented slot-shaped openings, alternating with continuous disks that lack such openings. The openings form channels through each stack that are joined either by the annular clearance space 36 at the stack periphery or by axial channels within the stack near the central opening 32 or the periphery, the axial channels formed by apertures through the entire stack that are aligned. The arrangement of openings and the resulting channels form two independent flow paths in heat exchange relationship but not in fluid communication, one flow path for the combustion gas and the other for the uncombusted hydrogen fuel that serves as the coolant. The flow path for the combustion gas passes radially outward through the upstream stack 33, then into the annular space 36, then radially inward through the downstream stack 34, then through tubular passages in a distribution manifold 37, and finally into the downstream section 22 of the chamber. The flow path for the hydrogen fuel acting as coolant enters the downstream stack 34 upon emerging from the jacket 16, then flows radially inward through the downstream stack 34 (counter-current to the combustion gas), then through axial passages that connect the downstream stack to the upstream stack 33, then radially outward through the upstream stack 33 (again, counter-current to the combustion gas) to a space above the upstream stack that leads outward, as represented by the dashed arrow 38. The emerging coolant, which is now heated to gaseous form, is directed to the drive turbine of the turbopump (shown in FIG. 2 and discussed below) where this heated gas pumps fresh coolant to the jacket while the heated gas is itself expanded and fed 27 to the preburner injector for combustion in the preburner and the main section of the combustion chamber. In both platelet stacks 33, 34, the channels carrying coolant alternate in the stack with those carrying the combustion gas, either by residing in alternating levels of the stack or by residing in alternating channels in single platelets within the stack. Channels in adjacent platelets of a given stack can be separated from each other by a solid continuous platelet. The partially cooled combustion gas from the preburner 21 is joined by the remainder of the liquid oxygen feed at the downstream face of the injector or distribution manifold 37 which distributes both the fuel-rich preburner gas and the freshly supplied oxygen across the width of the chamber.

Figure 2:
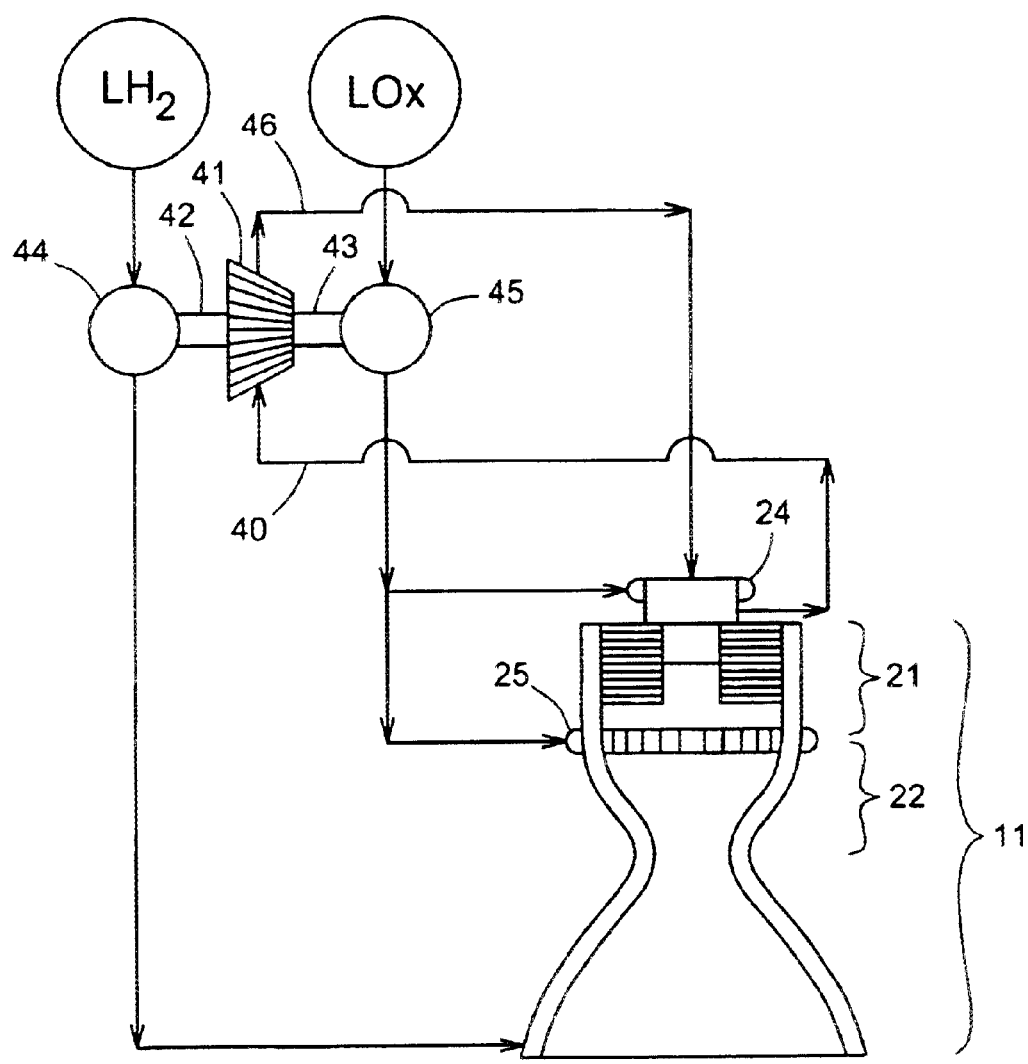
FIG. 2 is a flow diagram of an expander cycle rocket engine that incorporates the nozzle shown in FIG. 1.

FIG. 2 is a flow diagram of one example of an expander cycle rocket engine that incorporates the chamber/nozzle of FIG. 1. The drive turbine 41 of a turbopump is driven by the coolant (heated but uncombusted hydrogen) gas 40 that emerges from the coolant passages in the upstream section 21 of the combustion chamber. The drive turbine turns two drive shafts 42, 43 that drive separate pumps 44, 45, for the liquid hydrogen and the liquid oxygen, respectively. (It is again emphasized that this is merely an example of a rocket engine in accordance with this invention; single-shaft turbopumps can be used as well.) The expanded uncombusted hydrogen 46 that emerges from the drive turbine is then injected into the combustion side of the upstream section 21 of the engine. The hydrogen that is pumped by the drive turbine enters the chamber/nozzle jacket 16 where it passes through the coolant channels in the jacket and then the platelet-stack heat exchanger in the preburner section and emerges in partially heated form to pass to the drive turbine 41. The oxygen that is pumped by the drive turbine is split upon leaving the oxygen pump 45 into two streams, a minor stream entering the inlet torus 24 of the preburner section of the combustion chamber and a major stream entering the inlet torus 25 of the main section of the combustion chamber.

The arrangement shown in FIG. 2 is a highly simplified representation of an expander cycle rocket engine. In practice, such engines will contain additional components such as valves, flow sensors, and pressure sensors and other flow control components or mechanisms, as well as additional pumps to assist in the staging of the oxygen feed, by-pass loops, and the like. The purposes and additional functions of these components will be readily apparent to those skilled in the art.

The foregoing description focuses on particular embodiments of the invention for purposes of explanation and illustration. Further embodiments and modifications of the above will be apparent to those skilled in the art upon reviewing this description, such embodiments and modifications falling within the scope of the invention as defined by the appended claims.

What is claimed is:

1. An injector/combustion chamber/heat exchanger assembly for an expander cycle rocket engine, said assembly comprising:

a chamber having an upstream section and a downstream section, means for injecting fluid fuel into said upstream section, and means for injecting fluid oxidizer separately into said upstream section and said downstream section, said upstream section containing a flow passage for a combustion gas mixture resulting from combustion of said fuel with said fluid oxidizer, said flow passage defined at least in part by a plurality of combustion gas channels;

a coolant system comprising:

a jacket in heat exchange relationship with said downstream section, means for feeding gaseous fuel to said jacket, and an array of coolant channels passing through said upstream section and arranged to receive gaseous fuel emerging from said jacket, said array of coolant channels being in heat exchange relationship with said plurality of combustion gas channels.

2. An assembly in accordance with claim 1 in which said combustion gas channels and said array of coolant channels are flow passages inside a laminate of platelets, each platelet less than about 0.064 cm in thickness and said flow passages defined by elongated etched regions in individual platelets, said combustion gas channels adjacent to but not in flow communication with said second array of coolant channels.

3. An assembly in accordance with claim 2 in which said combustion gas channels and said array of coolant channels are arranged for counter-current flow.

4. An assembly in accordance with claim 1 in which said means for feeding gaseous fuel to said jacket are means for producing counter-current flow of said gaseous fuel with combustion gas flowing through said downstream section.

5. An assembly in accordance with claim 2 in which said means for feeding gaseous fuel to said jacket are means for producing counter-current flow with combustion gas flowing through said downstream section, and said combustion gas channels and said array of coolant channels are arranged for counter-current flow.

6. An assembly in accordance with claim 2 in which said upstream and downstream sections of said chamber have a common axis, and said flow passages inside said laminate are oriented in directions transverse to said axis.

7. An assembly in accordance with claim 6 in which said flow passages are radially oriented relative to said axis.

8. A method for combusting rocket fuel and heating uncombusted fuel for an expander cycle rocket engine, said method comprising:

supplying fluid fuel and fluid oxidizer to an upstream section of a chamber at a ratio of oxidizer to fuel that combusts in said upstream section to produce a combustion gas having a temperature that is less than 2000 degrees Rankine;

combining said combustion gas emerging from said upstream section with further fluid oxidizer in a downstream section of said chamber;

passing uncombusted fuel through a jacket encircling said downstream section to engage in heat exchange with said combustion gas in said downstream section, and passing said uncombusted fuel emerging from said jacket through an array of coolant channels in said upstream section to engage in heat exchange with said combustion gas in said upstream section.

9. A method in accordance with claim 8 in which said fluid oxidizer supplied to said upstream section and said downstream section are supplied at a combined rate that is from about 50% to about 100% stoichiometric relative to said fluid fuel, and said fluid oxidizer supplied to said upstream section is from about 3% to about 30% of the total of said fluid oxidizer fed to said upstream and downstream sections.

10. A method in accordance with claim 8 in which said fluid oxidizer supplied to said upstream section and said downstream section are supplied at a combined rate that is from about 50% to about 100% stoichiometric relative to said fluid fuel, and said fluid oxidizer supplied to said upstream section is from about 5% to about 20% of the total of said fluid oxidizer fed to said upstream and downstream sections.

11. A method in accordance with claim 8 in which said fluid fuel is heated gaseous hydrogen and said fluid oxidizer is liquid oxygen, said liquid oxygen supplied to said upstream section and said liquid oxygen supplied to said downstream section are supplied at a combined rate that is from about 65% to about 85% of stoichiometric relative to said hydrogen, and said liquid oxygen supplied to said upstream section is from about 5% to about 20% of the total of said liquid oxygen supplied to said upstream and downstream sections.

12. A method in accordance with claim 8 in which said coolant channels in said upstream section are flow passages inside a laminate of platelets, each platelet less than about 0.064 cm in thickness and said flow passages defined by etched regions in individual platelets, said uncombusted fuel passing through a first set of said flow passages and said combustion gas passing through a second set of said flow passages that are adjacent to but not in flow communication with said first set.

13. A method in accordance with claim 12 in which said first set of flow passages and said second set of flow passages are arranged for counter-current flow.

14. A method in accordance with claim 8 in which said uncombusted fuel and said combustion gas are passed through said jacket in counter-current flow.

15. A method in accordance with claim 12 in which said uncombusted fuel and said combustion gas are passed through said jacket in counter-current flow and said first set of flow passages and said second set of flow passages are arranged for counter-current flow.

\* \* \* \* \*